2,781,400
Patented Feb. 12, 1957

2,781,400

6-BROMO-1,2,3,4,4a,9,10,10a - OCTAHYDRO-7-ISO-PROPYL - 4a - METHYLPHENANTHRENE KETONES

Robert P. Jacobsen, Shrewsbury, Mass., assignor, by mesne assignments, to G. D. Searle & Co., Skokie, Ill., a corporation of Delaware No Drawing. Application October 22, 1953,
Serial No. 387,792

3 Claims. (Cl. 260—586)

This invention relates to halogenated alkyl-substituted octahydrophenanthrene ketones and processes for the preparation thereof. More particularly, this invention relates to 6-halo-1,2,3,4,4a,9,10,10a-octahydro-7-isopropyl-4a-methylphenanthrene ketones having the formula

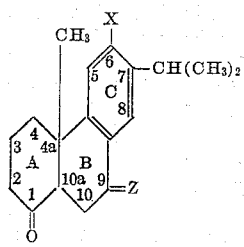

wherein X is a halogen atom, and Z represents two hydrogen atoms individually bonded to the carbon atom in position 9, or a single oxygen atom doubly bonded to the aforesaid $C_9$ carbon.

It will be recognized that the subject compounds can and do exist in various stereoisomeric configurations. Thus, rings A and B may, alternatively, be cis or trans, one to the other; and each of these forms, in turn occur in either of two enantiomorphic (and optically active) modifications or a racemic combination of these modifications.

The compounds to which this invention relates are useful in medicine as hormonal agents. Especially, the instant compounds are of value in the treatment of various non-androgenic dysfunctions associated with adrenocorticoid imbalance. Thus, for example, being possessed of a potent myotrophic activity uncomplicated by the capacity for testoid stimulation which characterizes and delimits the anabolic utility of testosterone and other naturally-occurring substances known to increase muscle strength and mass, the compounds of this invention are uniquely adapted to use in the care of premature infants, the management of convalescence from acute illness and surgical procedures, and for long-term administration to patients with chronic debilitating disease.

Additionally, the subject compounds are useful as intermediates in the synthesis of other therapeutically interesting materials. Thus, one of the compounds of this invention, a 6-bromo-1,2,3,4,4a,9,10,10a-octahydro-7-isopropyl-4a-methyl-1-oxophenanthrene having the formula

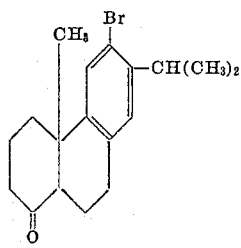

may be converted to the corresponding 6-bromo-1,2,3,4,4a,9,10,10a-octahydro - 1 - hydroxy-7-isopropyl-4a-methylphenanthrene, a useful hormonal substance, by treatment with a reducing agent such as aluminum isopropoxide in isopropyl alcohol, or lithium aluminum hydride in a solvent such as diethyl ether. The aluminum isopropoxide reduction is carried out by refluxing an isopropyl alcohol solution of the starting ketone in the presence of an excess of reducing agent, provision being made for slowly distilling off the acetone formed in process through a suitable column. When a test portion of the distillate thus obtained no longer gives a precipitate of acetone dinitrophenylhydrazone on mixing with an aqueous solution of 2,4-dinitrophenylhydrazine, the reduction is complete and the reaction mixture is thereupon worked up by dilution with water and addition of sufficient hydrochloric acid, sodium hydroxide, or sodium potassium tartrate to dissolve the precipitate of aluminum hydroxide which forms. An ether extraction is then carried out; and finally the extract is consecutively washed, dried, and concentrated to provide the desired 1-hydroxy compound as a residue. Further purification may be effected by distillation in vacuo. The alternative reduction using lithium aluminum hydride takes place in refluxing ether, the starting ketone being added to the hydride solution in dropwise fashion. After a suitable reflux period, the reaction mixture is worked up as hereinafter described (Example 1A) for the lithium aluminum hydride reduction of methyl 6-bromodehydroabietate. The 6-bromo-1,2,3,4,4a,9,10,10a-octahydro-1-hydroxy-7-isopropyl-4a-methylphenanthrene thus obtained is not only valuable in itself, but serves also as a starting point for the synthesis of another chemotherapeutically useful substance, a 6-bromo-1,2,3,4,4a,9,10,10a-octahydro-1-hydroxy-7-isopropyl-4a-methyl-9-oxophenanthrene. The latter product is prepared by acetylation of the foregoing alcohol according to conventional techniques, followed by chromic acid oxidation to the 1-acetoxy-9-oxo compound in accordance with procedures detailed in the examples which are a part of this specification, and finally, hydrolysis of this intermediate to the desired 6-bromo-1,2,3,4,4a,9,10,10a-octahydro - 1 - hydroxy-7-isopropyl-4a-methyl-9-oxophenanthrene.

By reduction with aluminum isopropoxide or lithium aluminum hydride, also, another of the compounds of this invention, a 6-bromo-1,2,3,4,4a,9,10,10a-octahydro-7-isopropyl-4a-methyl-1,9-dioxophenanthrene having the formula

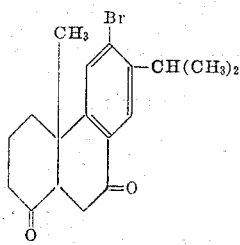

may be converted to the corresponding 6-bromo-1,2,3,4,4a,9,10,10a-octahydro - 1,9 - dihydroxy-7-isopropyl-4a-methylphenanthrene. This diol, in turn, may be selectively oxidized to a 6-bromo-1,2,3,4,4a,9,10,10a-octahydro-9-hydroxy-7-isopropyl - 4a - methyl-1-oxophenanthrene, which, like the alcohol from which it is made, is also a potent hormonal agent.

The foregoing hydroxy and hydroxyoxo compounds, for the preparation of which the ketones of this invention serve as useful intermediates, may also be beneficially obtained in the form of their lower alkyl, phenyl, and benzyl ethers. The latter compounds are synthesized by conventional means from the appropriate starting alcohol, for example, by treatment thereof with lower alkyl or selected aryl halides or with di-lower-alkyl sulfates, as indicated, in the presence of alkali.

The compounds of this invention are soluble in alcohol, as also in propylene gylcol. They may be administered in solid form as tablets or capsules; dissolved or suspended in aqueous alcohols, they may be given parenterally.

A preferred starting material for synthesis of the compounds to which this invention relates is methyl 6-bromodehydroabietate, which may be prepared according to the method of Campbell and Morgana, "Journal of the American Chemical Society," 63, 1838 (1941). This material is reacted with a reducing agent, such as lithium aluminum hydride, in an inert solvent, to give 6-bromo-1,2,3,4,4a,9,10,10a - octahydro - 7 - isopropyl - 1,4a - dimethylphenanthrene - 1 - methanol (6 - bromodehydroabietinol). The latter substance, upon treatment with phosphorus pentachloride, phosphorus pentoxide, or the equivalent, undergoes dehydration-rearrangement to an ethylidene compound of the formula

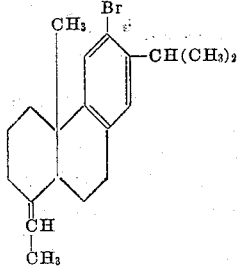

The ethylidene compound is, in turn, oxidized, as for example by ozonolysis, to give a 6-bromo-1,2,3,4,4a,9,10,10a - octahydro - 7 - isopropyl - 4a - methyl - 1 - oxophenanthrene. The monoketones thus represented, all compounds of the present invention may be converted to the corresponding diketones of this invention by mild chromic acid oxidation or the equivalent.

The following examples will illustrate in detail certain of the compounds which constitute the present invention, and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *6 - bromo - 1 - ethylidene - 1,2,3,4,4a,9,10,10a -octahydro - 7 - isopropyl - 4a - methylphenanthrene.*—Methyl 6-bromodehydroabietate, prepared according to the method of Campbell and Morgana, loc. cit., is converted to a 6 - bromo - 1,2,3,4,4a,9,10,10a - octahydro - 7 - isopropyl - 1,4a - dimethylphenanthrene - 1 - methanol (6 - bromodehydroabietinol) by reduction of 125 parts thereof with 10 parts of lithium aluminum hydride in 475 parts of anhydrous ether. The starting ester—being only slightly soluble in ether—is incorporated in the reaction mixture by continuous extraction, using a modified Soxhlet apparatus. Work-up of the reaction mixture proceeds through dropwise addition of sufficient ethyl acetate to react with excess hydride, after which water is cautiously introduced until hydrogen evolution ceases, and finally the cooled suspension obtained at this point is acidified with dilute hydrochloric acid. The ether layer is separated and consecutively washed with water, dilute aqueous sodium bicarbonate, and saturated aqueous sodium chloride. Solvent is stripped, and the residue is then crystallized from aqueous methanol. The 6 - bromo - 1,2,3,4,4a,9,10,10a - octahydro - 7 - isopropyl - 1,4a - dimethylphenanthrene - 1 - methanol thus prepared has a melting point of approximately 116° C. A solution of 20 parts of this material in 90 parts of anhydrous benzene is added to a stirred, boiling suspension of 20 parts of phosphorus pentoxide in 130 parts of commercial n-hexane which has been preliminarily treated by repeated boiling with (fresh) phosphorus pentoxide and subsequent distillation to the point where essentially no color develops in the boiling hexane-phosphorus pentoxide suspension. When the addition of carbinol is complete, the reaction mixture is cooled; and the spent dehydrating agent is allowed to settle out. The supernatant hexane solution is decanted and the residue then washed superficially with (fresh) n-hexane, these washings being added to the decanted material. The hexane solution is allowed to stand with intermittent agitation in contact with an aqueous slurry of sodium bicarbonate until free of acid, whereupon it is separated, shaken with anhydrous sodium bicarbonate, filtered, and stripped of solvent under reduced pressure, in that order. Vacuum distillation of the oily residue affords a hydrocarbon mixture, B. P. 144–148° C. at 0.03 mm. pressure and $[\alpha]^{27}_D +208°$, one constituent of which is 6-bromo-1-ethylidene-1,2,3,4,4a,9,10,10a - octahydro - 7 - isopropyl - 4a - methylphenanthrene.

B. *6 - bromo - 1,2,3,4,4a,9,10,10a - octahydro - 7 - isopropyl-4a-methyl-1-oxophenanthrene semicarbazone.*— A solution of approximately 28 parts of the ethylidene-containing hydrocarbon of the preceding part A in approximately 370 parts of methyl acetate is treated at —75° C. for approximately 3 hours with oxygen containing 4% ozone. The desired ozonide thus formed has the formula

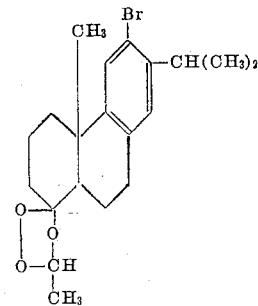

The reaction mixture is steam distilled to remove solvent and decompose the ozonide, whereupon the distilland is extracted with ether. The extract, after being washed with dilute aqueous sodium bicarbonate and then dried over an hydrous sodium sulfate, is stripped of solvent. The residual oil thus obtained is refluxed for 2 hours with methanolic semicarbazide prepared as follows: 26 parts of semicarbazide hydrochloride and 12 parts of anhydrous sodium carbonate is triturated with succeeding portions of methyl alcohol until carbon dioxide evolution ceases; the combined supernatants are filtered; 2.6 parts of glacial acetic acid is added to the filtrate; and, finally, the filtrate volume is brought to approximately 100 times that of the added acid, with methyl alcohol. Precipitation occurs during the reflux period. The cooled reaction mixture is poured into approximately 3 volumes of well-stirred cold water, whereupon the precipitated solid is, successively, collected, washed with water, and dried in air. Repeated extraction of this material with small volumes of methyl alcohol leaves the desired semicarbazone as a sparingly soluble residue which, recrystallized from chloroform, shows M. P. approximately 262° C., $[\alpha]^{30}_D +212°$. The 6 - bromo - 1,2,3,4,4a,9,10,10a - octahydro - 7 - isopropyl-4a-methyl-1-oxophenanthrene semicarbazone thus prepared has the formula

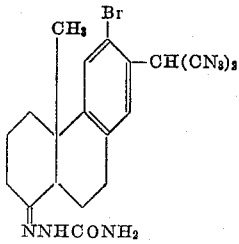

C. *6 - bromo-1,2,3,4,4a,9,10,10a - octahydro - 7 - isopropyl-4a-methyl-1-oxophenanthrene.*—A suspension of 2.5 parts of the semicarbazone of the foregoing part B in 200 parts of methanol is refluxed for 45 minutes with 50 parts of water containing 4 parts of approximately 20% aqueous hydrochloric acid, nearly complete solution being achieved in process. The reactants are poured into cold water and the resultant mixture extracted with n-pentane. The pentane solution, washed with water, dried over anhydrous sodium sulfate, and stripped of solvent, in that order, affords a 6-bromo-1,2,3,4,4a,9,10,10a-octahydro-7-isopropyl-4a-methyl-1-oxophenanthrene as a solid residue, which, crystallized from methyl alcohol, shows M. P. 130–132° C., $[\alpha]^{26}_D$ +135°.

*Example 2*

*6 - bromo - 1,2,3,4,4a,9,10,10a - octahydro - 7 - isopropyl-4a-methyl-1,9-dioxophenanthrene.*—A solution of approximately 3 parts of the bromoketone of Example 1C in 40 parts of acetic acid is cooled and mixed with 13 parts of a chromic acid solution consisting of 1 part chromic anhydride and 4 parts of 80% aqueous acetic acid. The reaction mixture is maintained at about 35° C. for 2–3 hours, at which point an additional 11 parts of the chromic acid solution is mixed in and the reactants then allowed to stand at the 35° temperature for 5–6 hours longer. Water is then added, following which sufficient aqueous sodium sulfite solution is introduced to neutralize excess chromic acid. The mixture is extracted with ether and the extract is washed with water, dilute aqueous caustic soda, water, and saturated aqueous sodium chloride, in that order. The ether solution is dried over anhydrous sodium sulfate and, finally, stripped of solvent. Crystallization of the residue from a mixture of ether and n-hexane provides the desired 6-bromo - 1,2,3,4,4a,9,10,10a - octahydro - 7 - isopropyl - 4a-methyl-1,9-dioxophenanthrene.

I claim:
1. A compound of the fromula

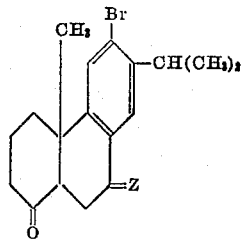

wherein Z is selected from the group consisting of 2 hydrogen atoms individually bonded to the carbon atom in position 9, and a single oxygen atom doubly bonded to the aforesaid $C_9$ carbon.

2. A 6-bromo-1,2,3,4,4a,9,10,10a-octahydro-7-isopropyl-4a-methyl-1-oxophenanthrene, having the formula

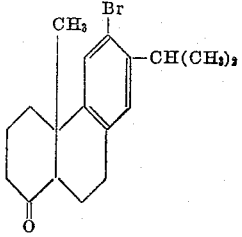

3. A 6-bromo-1,2,3,4,4a,9,10,10a-octahydro-7-isopropyl-4a-methyl-1,9-dioxophenanthrene, having the formula

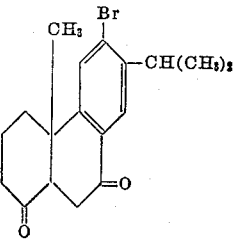

References Cited in the file of this patent

Campbell et al.: Jour. Am. Chem. Soc. 63, 1838 (1941).
Cook et al.: Jour. Chem. Soc. 1944, pp. 286–293.
Brossi et al.: Helv. Chim. Acta, 33, 1730 (1950).